US008600144B2

(12) United States Patent
Kask

(10) Patent No.: US 8,600,144 B2
(45) Date of Patent: Dec. 3, 2013

(54) METHODS AND APPARATUS FOR IMAGE ANALYSIS USING PROFILE WEIGHTED INTENSITY FEATURES

(75) Inventor: Peet Kask, Harju maakond (EE)

(73) Assignee: PerkinElmer Cellular Technologies German GmbH, Tallinn (EE)

( * ) Notice: Subject to any disclaimer, the term of this patent is extended or adjusted under 35 U.S.C. 154(b) by 171 days.

(21) Appl. No.: 13/291,438

(22) Filed: Nov. 8, 2011

(65) Prior Publication Data

US 2013/0114875 A1 May 9, 2013

(51) Int. Cl.
*G06K 9/46* (2006.01)

(52) U.S. Cl.
USPC .............................. 382/133; 382/190; 382/199

(58) Field of Classification Search
USPC ............................ 382/133, 134, 190, 199, 224
See application file for complete search history.

(56) References Cited

U.S. PATENT DOCUMENTS

2008/0166035 A1* 7/2008 Qian et al. .................... 382/133
2010/0150423 A1* 6/2010 Hong et al. .................... 382/133

OTHER PUBLICATIONS

Wu et al. "Identifying Immature Precursor Cells in Bone Marrow Pathological Images Based on Distance Transform and Internal Structures of Cells." International Conference on Multimedia Technology, Oct. 29, 2010, p. 1-4.*
Jun et al. "Cell Image Processing Based on Distance Transform and Regional Growth." Fifth International Conference on Internet Computing for Science and Engineering, Nov. 1, 2010, pp. 6-9.*
Al-Kofahi et al. "Improved Automatic Detection and Segmentation of Cell Nuclei in Histopathology Images." IEEE Transactions on Biomedical Engineering, vol. 57, No. 4, Apr. 2010, pp. 841-852.*
Lin et al. "Automated 3-D Quantification of Brain Tissue at the Cellular Scale from Multi-Parameter Confocal Microscopy Images." 4th IEEE International Symposium on Biomedical Imaging: From Nano to Macro, Apr. 12, 2007, pp. 1040-1043.*

* cited by examiner

*Primary Examiner* — Jon Chang
(74) *Attorney, Agent, or Firm* — Choate Hall & Stewart LLP

(57) ABSTRACT

A new morphological feature referred to herein as profile weighted intensity feature is provided, useful for automated classification of objects, such as cells, that are depicted in digital images. In certain embodiments, the profile weighted intensity feature is determined by automatically identifying a border of a cell in an input image, determining a distance image for the cell, computing a profile function for the cell, and computing a mean intensity of at least a portion of the input image weighted by the profile function for the cell.

16 Claims, 13 Drawing Sheets

METHODS AND APPARATUS FOR IMAGE ANALYSIS USING PROFILE WEIGHTED INTENSITY FEATURES

TECHNICAL FIELD

This invention relates generally to image processing techniques for identifying and characterizing objects within digital images. More particularly, in certain embodiments, the invention relates to methods and apparatus for characterizing a new morphological feature referred to herein as a profile weighted intensity feature, of cells in a digital image, and applying this feature in the automated classification of cell phenotype, for example, in image analysis software.

BACKGROUND

The ability to automatically classify objects into categories of interest has applications across a wide range of industries and scientific fields, including biology, social sciences, and finance. One particular application of interest is the classification of biological cells according to cell phenotype.

An accurate and efficient automated cell phenotype classification method requires identifying morphological characteristics of individual cells, as pictured in a digital image, which are useful for distinguishing different cell phenotypes. Thus, when using image processing techniques to perform cell phenotype classification, it is desired to identify morphological features that vary according to the different cell types in an image and are characteristic of those cell types. A cell type having a unique size, for example, may be identified by evaluating the sizes of the cells in the image. Likewise, a cell type having a particular characteristic shape or color may be identified by evaluating the shapes and colors of the cells in the image. The more a morphological feature (e.g., size, shape, or color) varies from one cell type to the next, the more useful that feature is for distinguishing different types of cells during cell phenotype classification.

Automated image processing techniques are useful to standardize the classification process for improved accuracy and speed of cell classification. However, existing automated image processing techniques are often incapable of distinguishing among the different cell phenotypes in an image. Existing image processing techniques can also be overly complicated, difficult to describe and implement, and computationally intensive.

There is a need for more accurate and efficient image processing techniques for identifying different types of objects in an image. In particular, there is a need for new morphological features that may be used to characterize cells in an image, for the purpose of automated cell phenotype classification.

SUMMARY OF THE INVENTION

The methods and apparatus described herein are capable of robust and efficient identification and characterization of morphological features of objects within an image. A new family of morphological features, referred to herein as profile weighted intensity features, is provided. These profile weighted intensity features are a type of weighted mean or sum intensity of one or more objects (e.g., cells) in an image.

By utilizing these new morphological features, a computationally efficient and more accurate tool is provided for identifying and classifying objects in images. For example, it has been discovered that automated cell phenotype characterization is improved by determining a mean intensity that more heavily weights pixel intensity near the borders of the cell (e.g., the outer cell border and/or the border of the cell nucleus), and using this mean intensity value in the algorithm to characterize cell phenotype. It has also been discovered that relative (e.g., normalized) intensities may be more favorable than absolute intensities for cell classification because large cell-to-cell variations in cellular samples are cancelled out or reduced when divided by another intensity of the same cell. In one embodiment, the profile weighted intensity features described herein are normalized. For example, for a given cell, a weighted mean intensity may be divided by a corresponding unweighted mean intensity, yielding a relative (unitless) feature. Furthermore, advances in the efficiency of certain computational step—for example, the use of a new sliding parabola erosion operation in the determination of a distance image—facilitate the efficient use of this new class of morphological features in the classification of objects (e.g., cells) in a digital image.

In one aspect, the invention relates to a method for determining a profile weighted intensity feature for a cell useful for classifying cell phenotype, the profile weighted intensity feature determined from one or more images of the cell. The method includes the steps of: (a) detecting a cell in an image; (b) computing a profile image for the cell, wherein pixel intensity of the profile image is a function of the closest distance from the pixel to a border of the cell; and (c) computing a profile weighted intensity feature for the cell using the profile image of the cell as a weight image, wherein the profile weighted intensity feature for the cell is a weighted mean intensity of pixels of the cell.

In certain embodiments, the method includes the step of classifying cell phenotype using the computed profile weighted intensity feature. The border may be, for example, an outer border of the cell. In one embodiment, the profile image is computed such that pixels near the border of the cell are emphasized and pixels a given distance away from the border of the cell are deemphasized. In certain embodiments, the distance image is determined via sliding parabola erosion operation performed on a cell mask image. In one embodiment, the calculated features include at least one of unnormalized intensities and normalized intensities. In certain embodiments, step (c) includes computing a profile weighted intensity feature for the cell from a filtered image of an acquired input image of the cell using the profile image of the cell as a weight image.

In another aspect, the invention relates to a method for determining a profile weighted intensity feature for a cell useful for classifying cell phenotype, the profile weighted intensity feature determined from one or more images of the cell. The method includes the steps of: (a) detecting a cell and detecting a nucleus of the cell from one or more images of the cell; (b) computing a profile image for the cell, wherein pixel intensity of the profile image is a function of both (i) the closest distance from the pixel to an outer border of the cell and (ii) the closest distance from the pixel to an outer border of a nucleus of the cell; and (c) computing a profile weighted intensity feature for the cell using the profile image of the cell as a weight image, wherein the profile weighted intensity feature for the cell is a weighted mean intensity of pixels of the cell. In certain embodiments, the profile weighted intensity feature for the cell is computed from a filtered image of an acquired input image of the cell using the profile image of the cell as a weight image.

In another aspect, the invention relates to a method for determining a profile weighted intensity feature for a cell useful for classifying cell phenotype, the profile weighted intensity feature determined from one or more images of the cell. The method includes the steps of: (a) detecting a plurality of borders of a cell from one or more images of the cell; (b) computing a profile image for the cell, wherein pixel intensity of the profile image is a function of the nearest distances from the pixel to each of the plurality of detected borders of the cell; and (c) computing a profile weighted intensity feature for the cell using the profile image of the cell as a weight image, wherein the profile weighted intensity feature for the cell is a weighted mean intensity of pixels of the cell. In certain embodiments, the profile weighted intensity feature for the cell is computed from a filtered image of an acquired input image of the cell using the profile image of the cell as a weight image.

In another aspect, the invention relates to an apparatus for determination of a profile weighted intensity feature for a cell useful for classifying cell phenotype, the profile weighted intensity feature determined from one or more images of the cell. The apparatus includes a memory for storing a code defining a set of instructions, and a processor for executing the set of instructions. The code includes a profile weighted intensity module configured to: (i) detect a cell in an image; (ii) compute a profile image for the cell, wherein pixel intensity of the profile image is a function of the closest distance from the pixel to a border of the cell (e.g., an outer border of the cell); and (iii) compute a profile weighted intensity feature for the cell using the profile image of the cell as a weight image, wherein the profile weighted intensity feature for the cell is a weighted mean intensity of pixels of the cell.

In certain embodiments, the profile weighted intensity module is configured to classify cell phenotype using the computed profile weighted intensity feature. In certain embodiments, the profile image is computed such that pixels near the border of the cell are emphasized and pixels a given distance away from the border of the cell are deemphasized. In certain embodiments, the distance image is determined via sliding parabola erosion operation performed on a cell mask image.

Elements of embodiments described with respect to a given aspect of the invention may be used in various embodiments of another aspect of the invention. For example, it is contemplated that features of dependent claims depending from one independent claim can be used in apparatus and/or methods of any of the other independent claims.

BRIEF DESCRIPTION OF THE DRAWINGS

The objects and features of the invention can be better understood with reference to the drawing described below, and the claims.

DESCRIPTION

Figure 1:
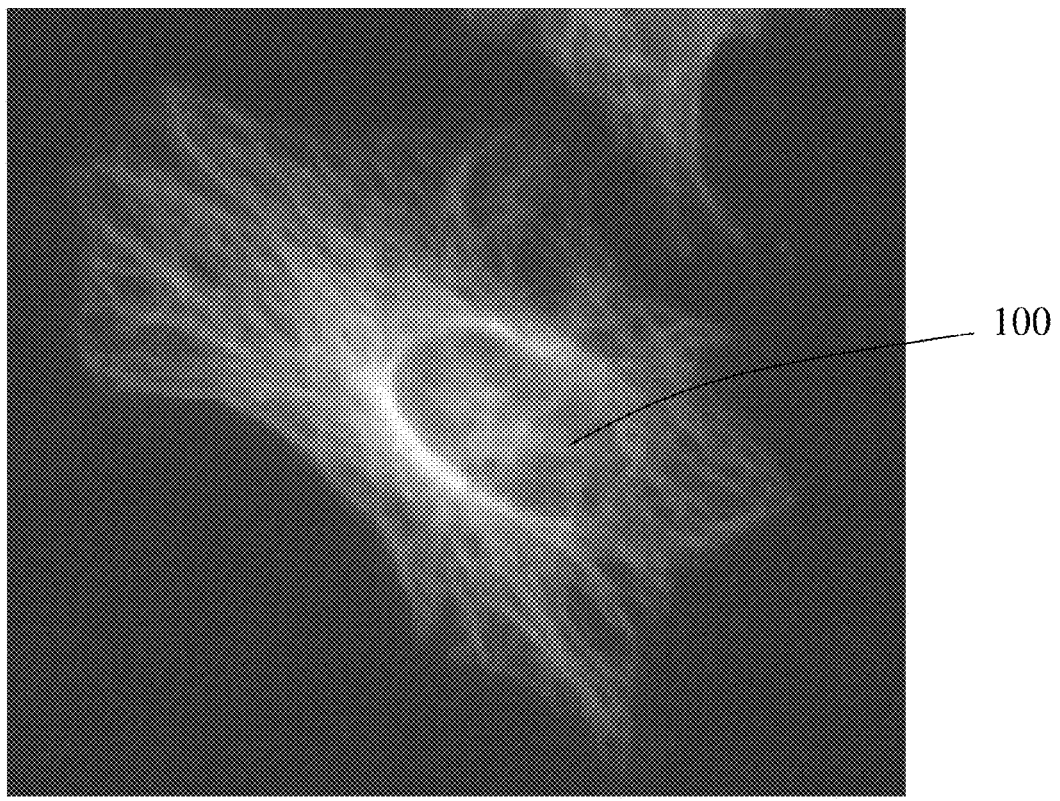
FIG. 1 is an image of a cell acquired using a detector that is sensitive to light emitted by a specific fluorophore, according to an illustrative embodiment of the present invention.

It is contemplated that apparatus, systems, methods, and processes of the claimed invention encompass variations and adaptations developed using information from the embodiments described herein. Adaptation and/or modification of the apparatus, systems, methods, and processes described herein may be performed by those of ordinary skill in the relevant art.

Throughout the description, where systems are described as having, including, or comprising specific components, or where processes and methods are described as having, including, or comprising specific steps, it is contemplated that, additionally, there are systems of the present invention that consist essentially of, or consist of, the recited components, and that there are processes and methods according to the present invention that consist essentially of, or consist of, the recited processing steps.

It should be understood that the order of steps or order for performing certain actions is immaterial so long as the invention remains operable. Moreover, two or more steps or actions may be conducted simultaneously.

The mention herein of any publication, for example, in the Background section, is not an admission that the publication serves as prior art with respect to any of the claims presented herein. The Background section is presented for purposes of clarity and is not meant as a description of prior art with respect to any claim.

When using image processing techniques, a cell phenotype classification process begins with the acquisition of an image or images depicting one or more cells. The next step is typically a segmentation step to detect one or more cells or portions of cells (e.g., a cell nucleus) in the image or images. Next, a set of features is extracted from the identified cells and used to characterize and classify the cells. In certain embodiments, one or more image filters are applied as part of the feature extraction step. The filters may include one or more texture energy filters, which are a special subset of image filters with non-negative output. In certain embodiments, the same filter that is used for extraction of texture features is additionally used for extraction of morphology features. In one embodiment, unweighted mean intensity of a texture-filtered image is a texture feature, and profile weighted mean intensity of the same texture-filtered image is a morphology feature.

Among the different types of images, a distance image is an image in which pixel intensity is proportional to a distance between the pixel and some other location in the image. For example, in a distance image of a biological cell, the intensity at each pixel within the cell may depend on the distance between the pixel and an edge of the cell, such as the outer edge of the cell or the edge of the nucleus. The relationship between intensity and distance may be linear or non-linear.

Weighted sum calculation and weighted mean calculation are examples of image processing techniques. Weighted sum calculation is determined by applying weights to the pixel intensities in an image (e.g., using another image or a set of data to provide the weights) and then adding the weighted pixel intensities. Similarly, weighted mean calculation is determined by applying weights to the pixel intensities in an image and then averaging the weighted pixel intensities. The resulting value obtained for both weighted sum calculation and weighted mean calculation is influenced more by some pixels (i.e., those that are weighted heavily) and less by other pixels (i.e., those that are not weighted heavily).

The methods and apparatus described herein provide a new family of morphological features for characterizing and/or classifying one or more objects (e.g., biological cells) in an input image. In one embodiment, the new family of morphological features is obtained by applying a filter (e.g., a texture energy filter) to the image. A distance image is calculated in which pixel intensity is a function of distance to the closest border pixel. For example, the distance image is advantageously calculated using the sliding parabola erosion technique described in U.S. patent application Ser. No. 13/230, 377, filed Sep. 12, 2011, entitled "Methods and Apparatus for Fast Identification of Relevant Features for Classification or Regression," the disclosure of which is hereby incorporated by reference herein in its entirety. The profile image is then used as a weight image for calculating the mean or sum intensity of another image, such as the input image.

FIGS. 1 through 8 are images of a cell 100, in accordance with certain embodiments of the invention. FIG. 1 is an image of the cell 100 acquired with a detector that is sensitive to light emitted by a specific fluorophore. Morphological features (e.g., numerical properties) within the cell 100 are indicated by variations in intensity within the image. The intensity variations may be quantified to identify and characterize morphological features of interest.

Figure 2:
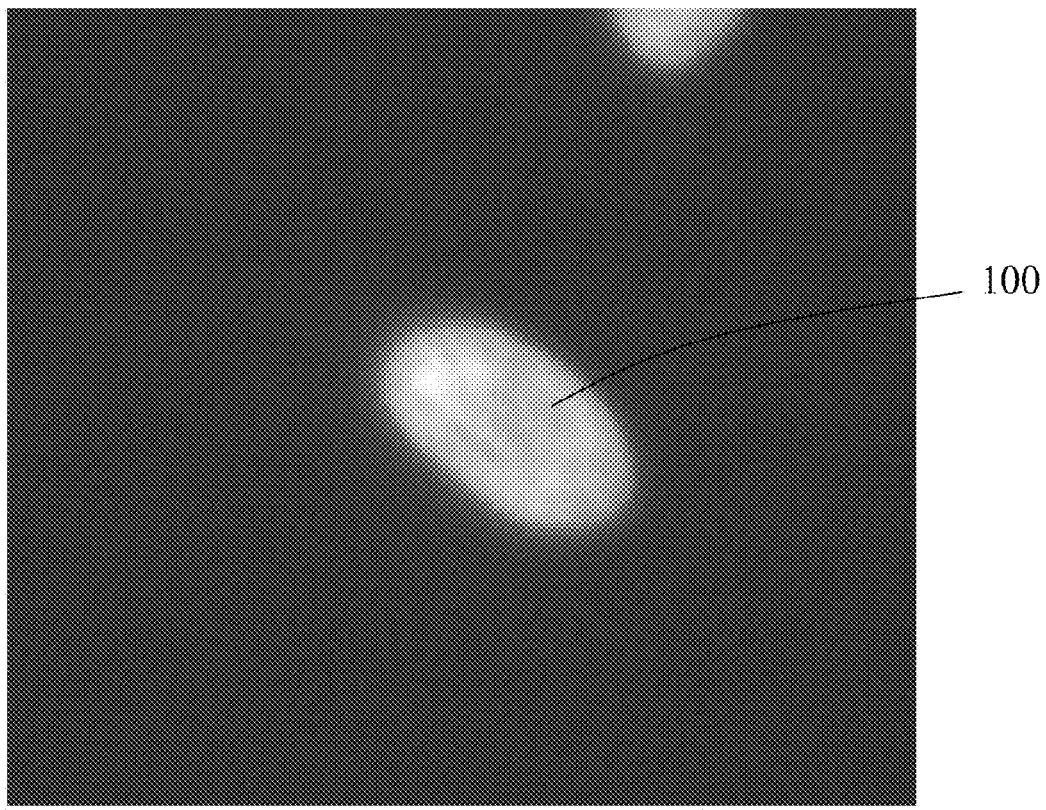
FIG. 2 is an image of the cell of FIG. 1 acquired using a detector that is sensitive to a nucleus stain, according to an illustrative embodiment of the present invention.
Figure 3:
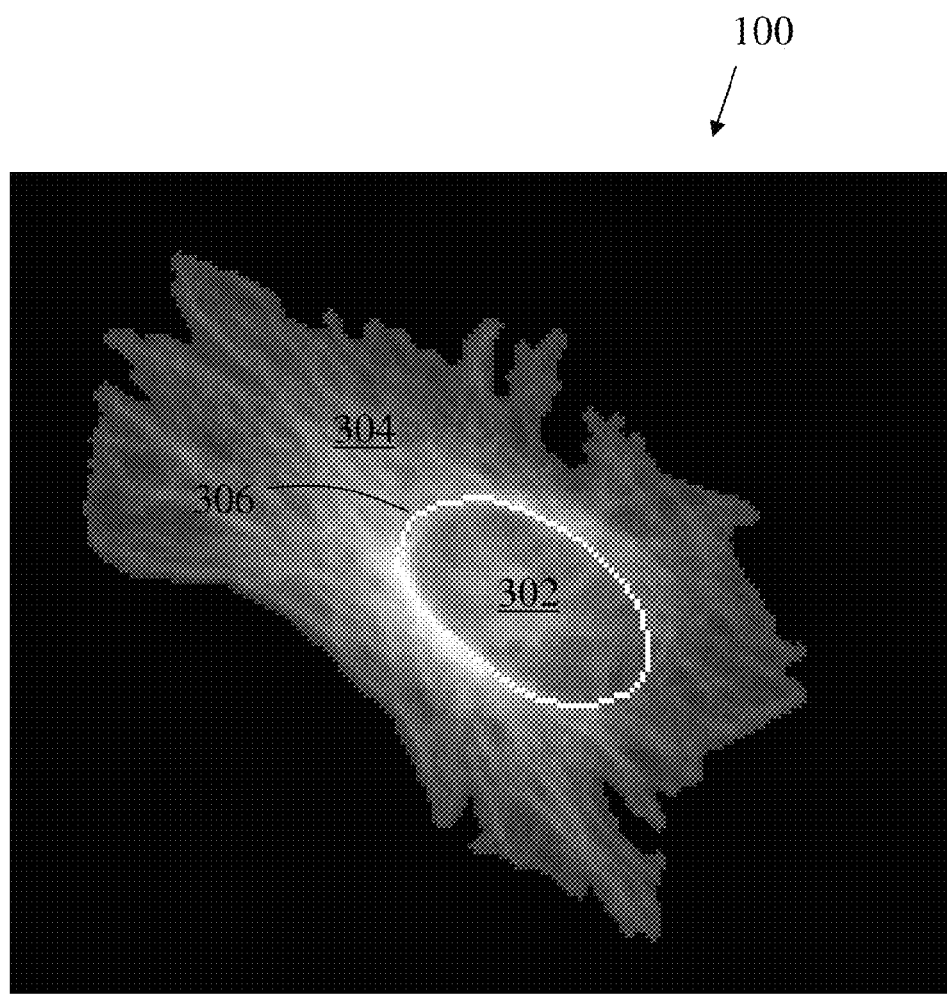
FIG. 3 is an image of the cell of FIG. 1 in which the cell and the cell nucleus have been identified, according to an illustrative embodiment of the present invention.

FIG. 2 is another image of the cell 100 acquired with a detector that is sensitive to a nucleus stain. This type of image may be useful for nucleus detection. For example, FIG. 3 is a similar image of the cell 100 after the cell 100, a cell nucleus 302, and cytoplasm 304 have been identified during segmentation. Pixels not belonging to the cell 100 are black. Pixels belonging to a border 306 of the nucleus 302 are highlighted. In certain embodiments, one input image is acquired for nuclei detection and another image is used for feature calculation or detection. In one embodiment, more than one image may be used for calculation of features.

Figure 4:
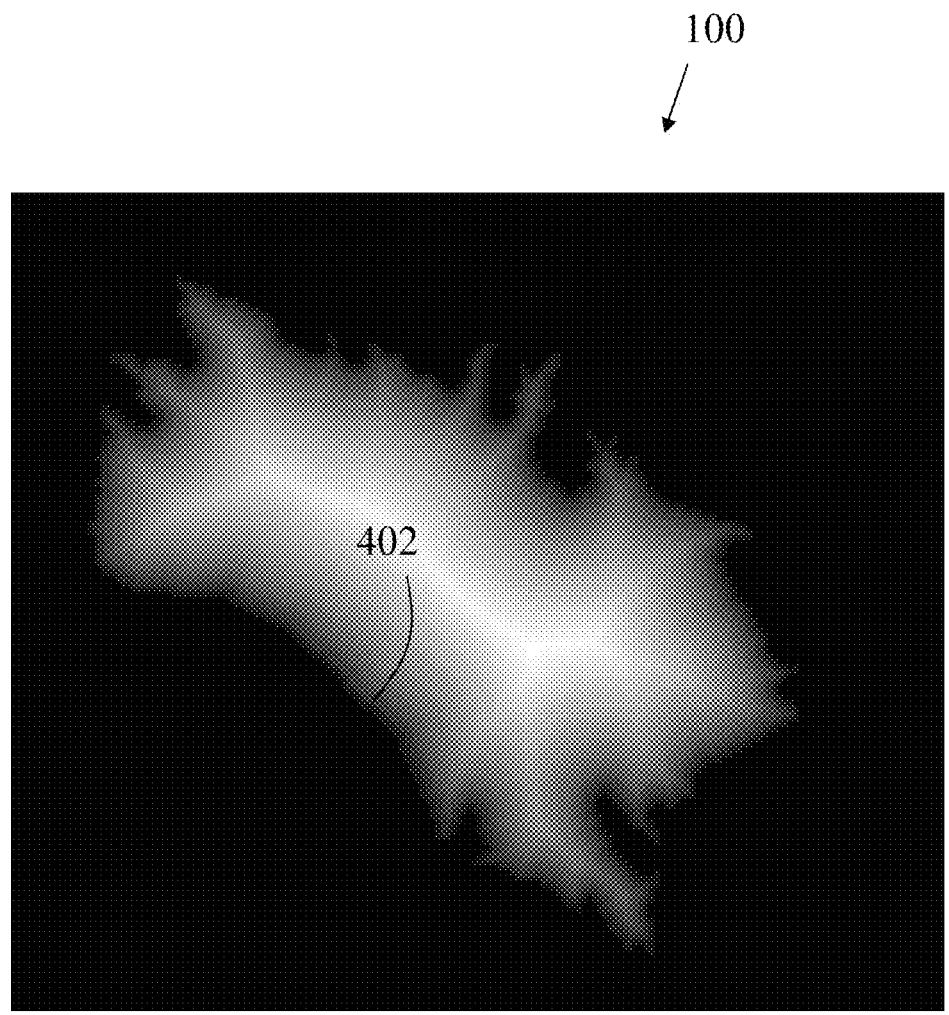
FIG. 4 is a distance image for the cell of FIG. 1 in which pixel intensity is a function of distance from an outer border of the cell, according to an illustrative embodiment of the present invention.
Figure 5:
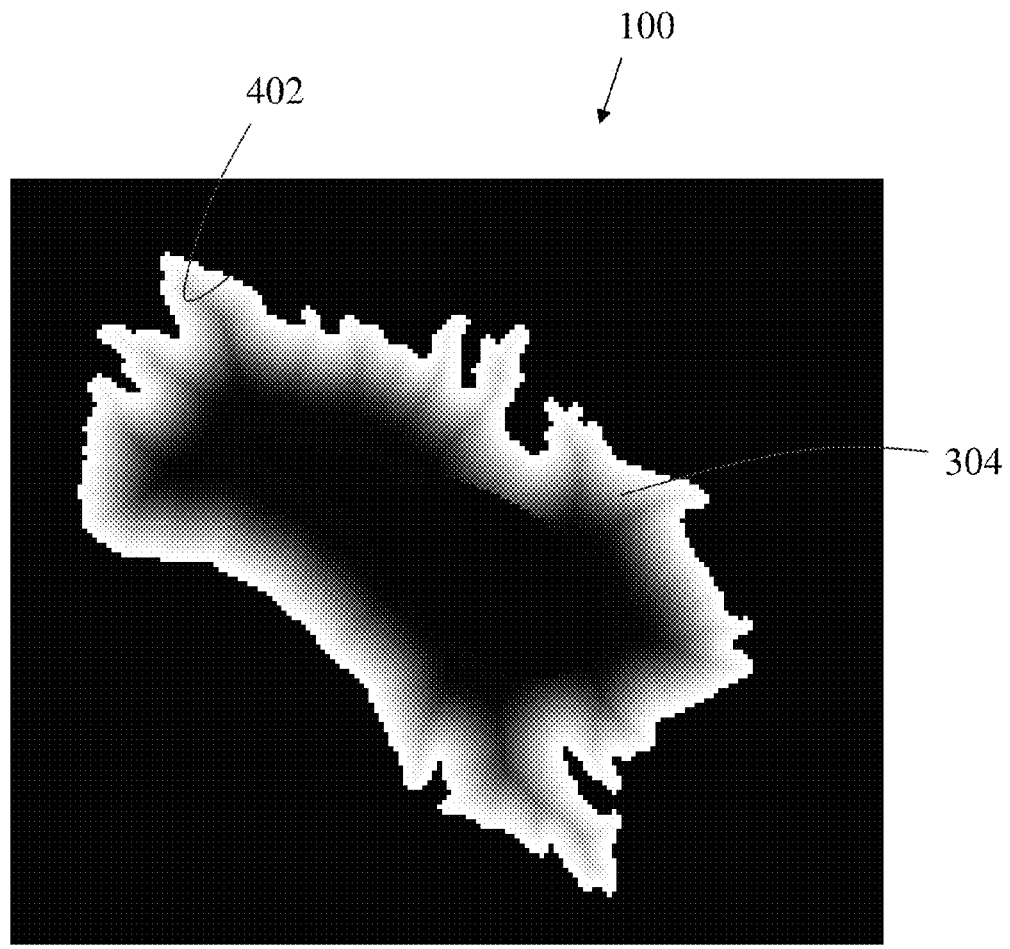
FIG. 5 is a profile image calculated from the distance image of FIG. 4, according to an illustrative embodiment of the present invention.

FIG. 4 is a distance image for the cell 100 in which pixels outside of the cell 100 are black and each pixel within the cell 100 has an intensity that is equal to or a function of (e.g., a linear function, a polynomial function, an exponential function, and/or a trigonometric function) the distance between the pixel and an outer border 402 of the cell 100. FIG. 5 is a profile image for the cell 100 calculated from the distance image of FIG. 4. The profile image characterizes or emphasizes the part of cytoplasm 304 closest to the outer border 402 (e.g., a cell membrane).

Figure 6:
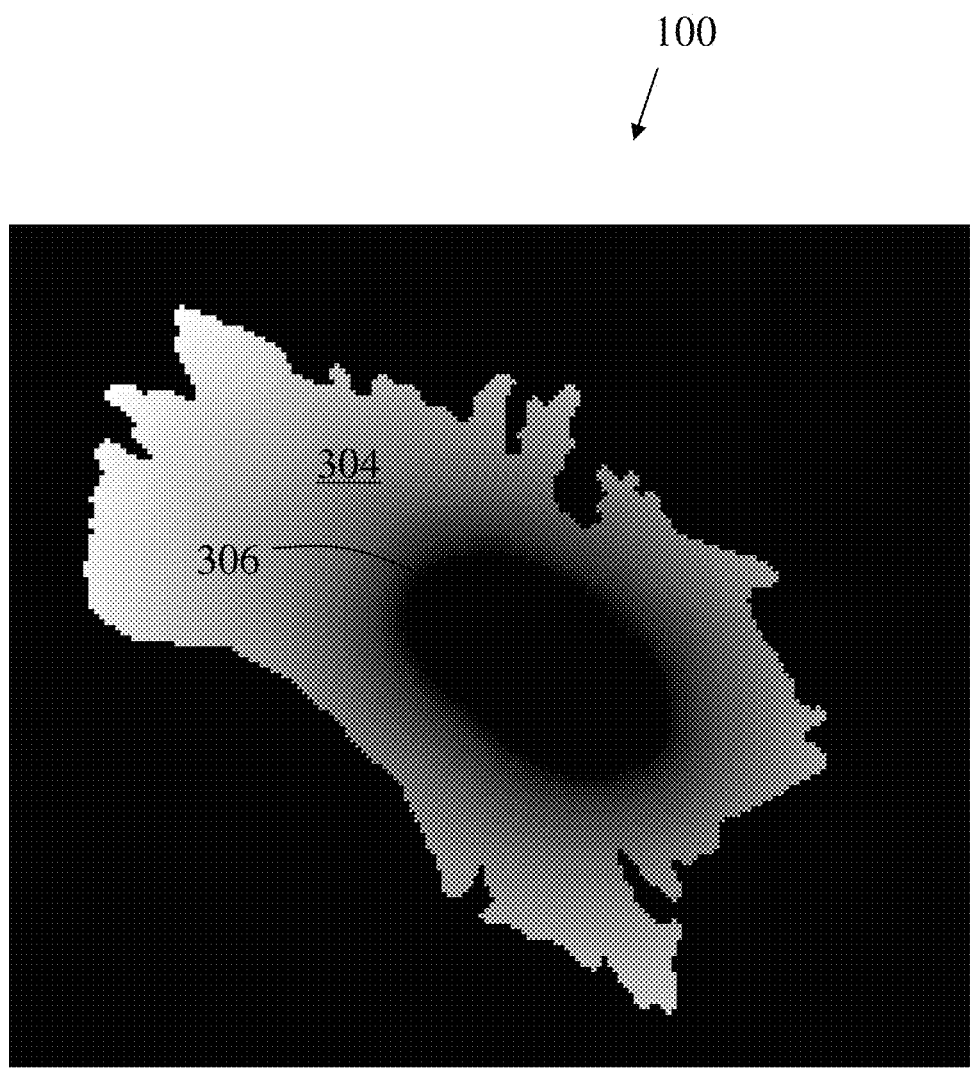
FIG. 6 is a distance image for the cell of FIG. 1 in which pixel intensity is a function of distance from a nucleus border, according to an illustrative embodiment of the present invention.
Figure 7:
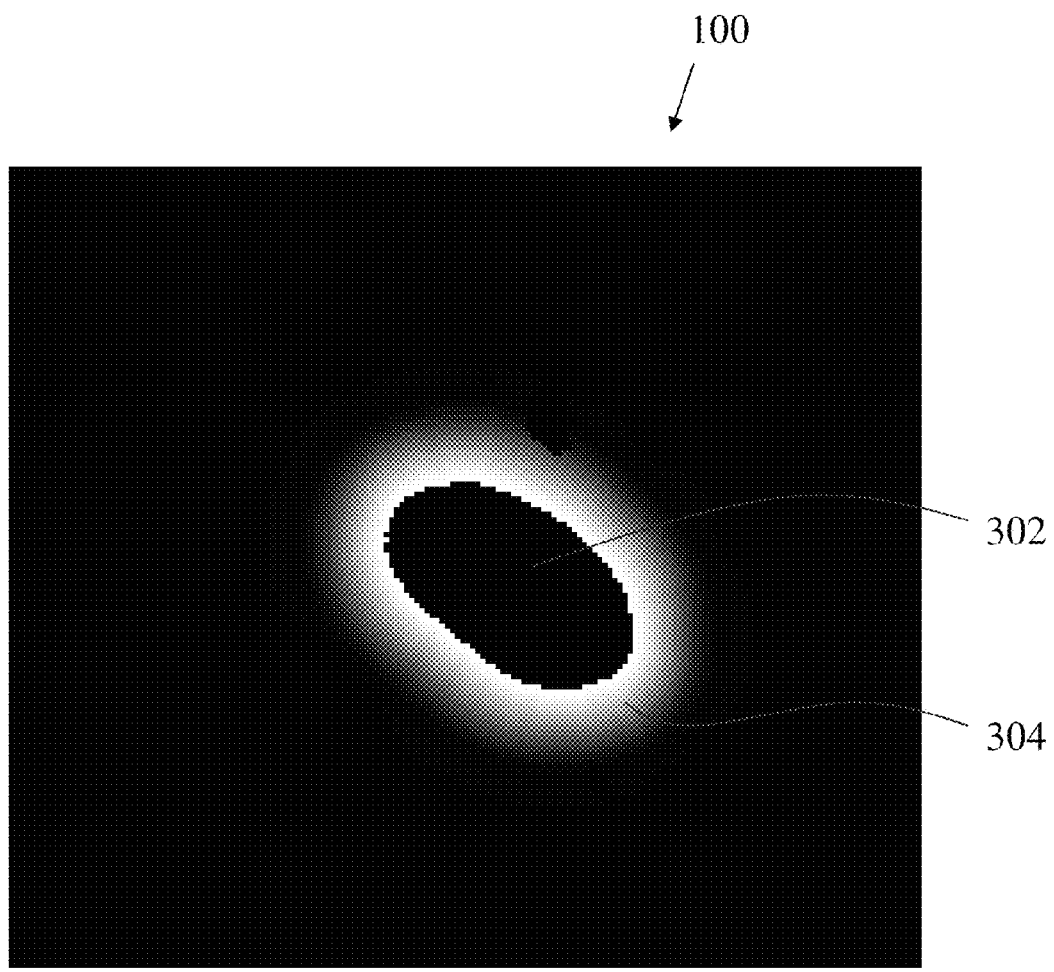
FIG. 7 is a profile image calculated from the distance image of FIG. 6, according to an illustrative embodiment of the present invention.

FIG. 6 is another distance image for the cell 100 in which each pixel within cytoplasm 304 of the cell 100 has an intensity equal to a function of the distance from the nucleus border 306. Pixels outside of the cell 100 and pixels within the nucleus 302 are black. FIG. 7 is a profile image for the cell 100 calculated from the distance image of FIG. 6. The profile image characterizes or emphasizes a part of cytoplasm 304 closest to the nucleus 302.

In certain embodiments, a profile image is a function of a single distance, even if there is more than one border (e.g., the nucleus border 306 and the outer border 402), as shown in FIGS. 5 and 7. In alternative embodiments, the profile image is equal to or a function of two distances. For example, a distance image may be generated in which the intensity of the distance image is a function of distance from a nucleus border and an outer cell border. A profile image may then be generated from the distance image such that the intensities in the profile image are a function of the distances from the two borders. The essence of the step of calculating a profile image does not depend on the number of borders considered for the calculation.

In certain embodiments, more than one profile image is calculated from a given distance image. For example, each profile image may be obtained using a different mathematical relationship between pixel intensity in the distance image and pixel intensity in the profile image.

Figure 8:
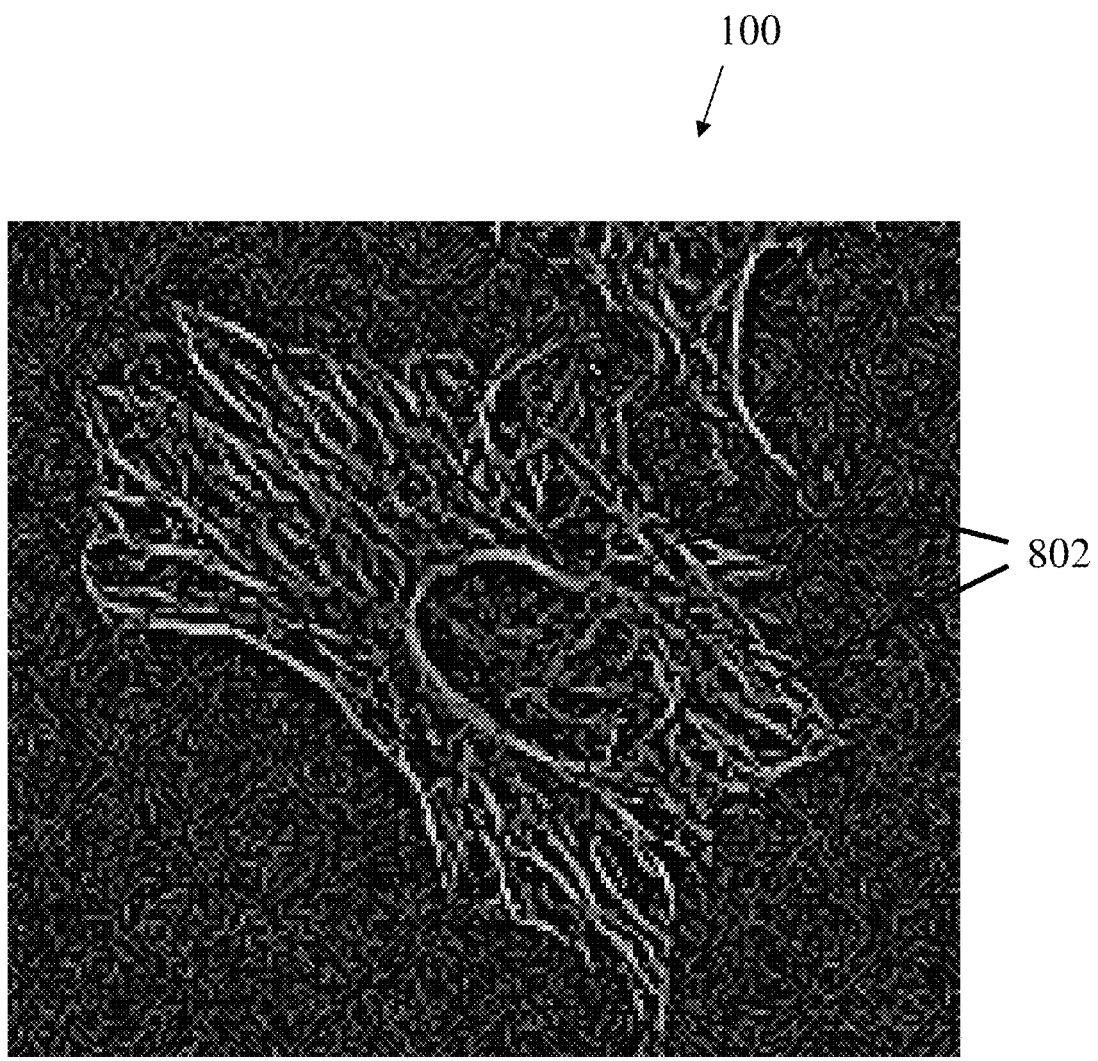
FIG. 8 is an image obtained by applying a texture energy filter to the image of FIG. 1, according to an illustrative embodiment of the present invention.

FIG. 8 is an image of the cell 100 obtained by applying a texture energy filter to the image of FIG. 1. As depicted, the texture energy filter detects and visualizes ridge-like structures 802 within the cell 100. In certain embodiments, morphological features characterizing the cell 100 are derived from this image in addition to or instead of the image of FIG. 1.

As mentioned above with respect to FIGS. 5 and 7, in certain embodiments, an object includes more than one border. For example, a cell may have a border at its outer edge (i.e., a cell border) and a border at the edge of its nucleus (i.e., a nucleus border). When two borders are identified for a single cell, there are two distances to consider for calculation of the distance image and/or the profile image. For example, the intensity of a pixel within the cell may be a function of the distance to the cell border and the distance to the nucleus border. In other words, intensities with the profile function (i.e., the function used to calculate intensities within a cell in a profile image) may be defined as a function of both distances in such case.

It is a convention that distances inside and outside the border are of opposite sign, considered as a signed coordinate. From the viewpoint of the present methods and apparatus, this convention may be useful. For example, the profile function must be defined on both sides of the border between nucleus and cytoplasm.

A profile function is a function of a distance, or distances if there are many borders. For example, the profile function may be profile=exp(−distance*distance/(2*w$^2$)), where profile is pixel intensity within a cell of the profile image, distance is the distance from a pixel to a border (or from a pixel to more than one border), and w is a width parameter. In certain embodiments, w is the width of the region near the border that will be characterized by the given intensity profile feature. The width w may be specified by a user and/or may have a default value. In this particular example, the profile function is high near the border of the cell and low when distance to the border is much higher than parameter w. The profile image must be calculated individually for each cell since each cell has an individual shape of the border line.

After the profile function has been used to calculate pixel intensities within the profile image, the profile image is used as weight function to calculate weighted average intensity of the input image for each cell. With this feature, each cell is characterized by a single numeric attribute, which may be referred to as the profile weighted intensity feature. When more than one input image and/or more than one profile image have been obtained, the profile weighted intensity feature may be calculated for each combination of input and profile images.

Figures 9A, 9B, 9C:
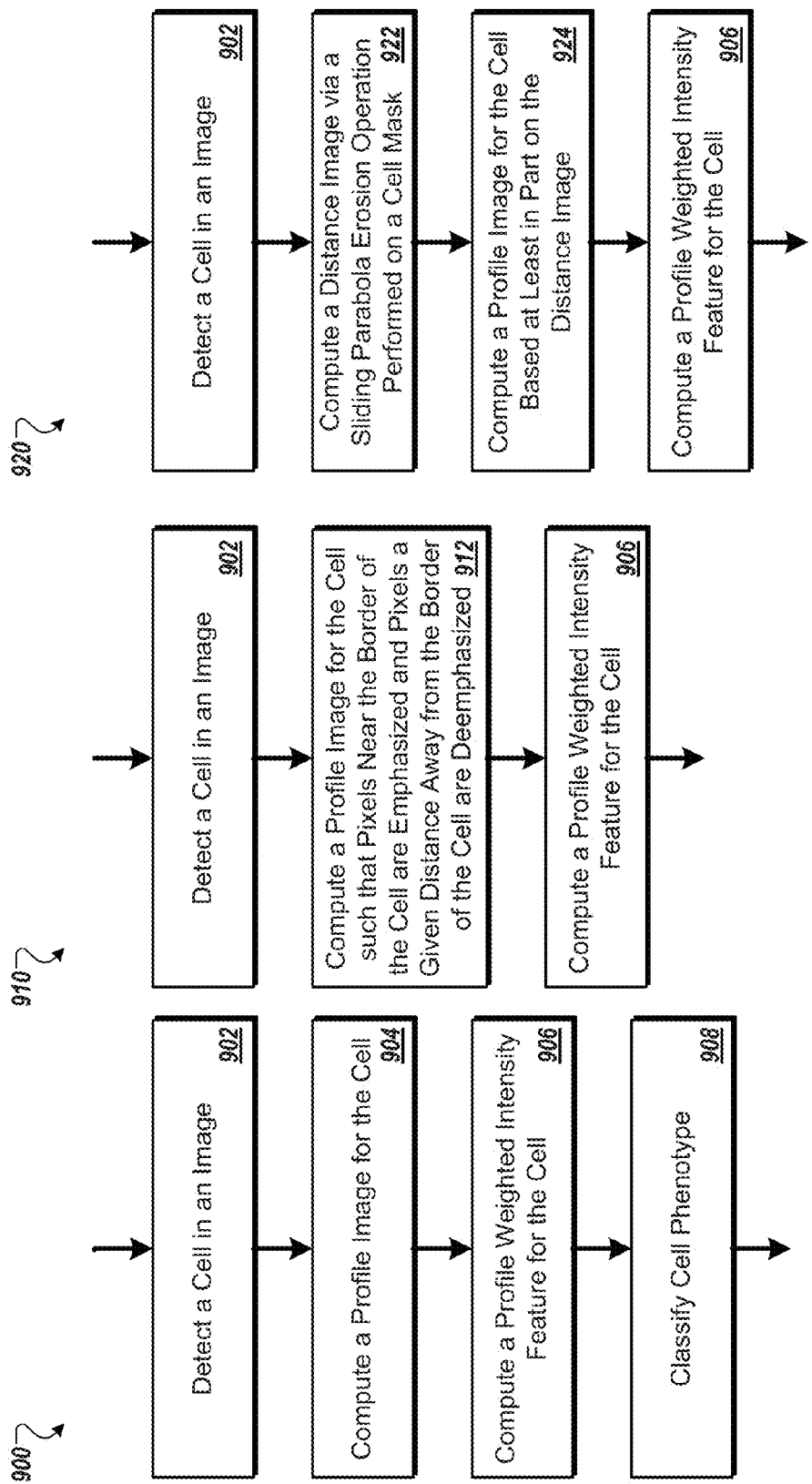
FIG. 9A is a flow chart of a first example method for determining of a profile weighted intensity features for a cell useful for classifying cell phenotype, according to an illustrative embodiment of the present invention.
FIG. 9B is a flow chart of a second example method for determination of a profile weighted intensity feature for a cell useful for classifying cell phenotype, according to a illustrative embodiment of the present invention.
FIG. 9C is a flow chart of a third example method for determination of a profile weighted intensity feature for a cell useful for classifying cell phenotype, according to an illustrative embodiment of the present invention.

FIG. 9A through 9C are flowcharts of example methods for determining profile weighted intensity features of cells useful for classifying cell phenotype, in accordance with various embodiments of the invention. The features are determined from one or more images of the cells. Turning to FIG. 9A, at step 902, the method 900 includes detecting a cell in an image. At step 904, the method 900 includes computing a profile image for the cell, wherein pixel intensity of the profile image is a function of the closest distance from the pixel to a border of the cell. According to one embodiment, the border is the outer border of the cell such as the outer border 402 of the cell 100 of FIG. 4. The border may be, for example, a cell border and/or a nucleus border. In one embodiment, the border is identified by applying an image filter and/or mask to the input image. In certain embodiments, the profile image is computed such that pixels near the border of the cell are emphasized and pixels a given distance away from the border of the cell are deemphasized as illustrated by step 912 of the method 910 of FIG. 9B. At step 906, the method 900 includes computing a profile weighted intensity feature for the cell using the profile image of the cell as a weight image, wherein the profile weighted intensity feature for the cell is a weighted mean intensity. The method 900 may also include step 908 of classifying cell phenotype using at least the computed profile weighted intensity.

In certain embodiments, the method 920 of FIG. 9C determines a distance image by performing a sliding parabola erosion operation on a mask image of the cell as illustrated by step 922 of FIG. 9C, thereby producing an eroded mask image that is related to or a known function of the distance image. The parabola-eroded mask image may then be used to determine or reconstruct the profile image. However, the profile image is not necessarily equal to or proportional to the distance image. Other functions of the distance image may be utilized to determine the profile image, for example exponential, Gaussian, or step functions, as identified by step 924 of FIG. 9C.

While sliding parabola erosion may be a preferable method for determining the distance image, other operations or techniques may also be used. For example, the distance image may be determined using rolling ball erosion and/or binary mask erosion/dilation operations, instead of sliding parabola erosion. In certain embodiments, the distance image is determined by calculating the distance between each pixel and one or more border. In one embodiment, sliding parabola erosion is a preferred technique because it is inexpensive (i.e., not computationally intensive) and accurate.

The method 900 may also include calculating a profile weighted intensity for the cell. When calculating a weighted mean intensity or intensities, image intensity is weighted by one or more profile functions, each calculated from one or more distance image.

Alternatively, in certain embodiments, the pixel intensity of a profile image is a function of both (i) the closest distance from the pixel to an outer border of the cell and (ii) the closest distance from the pixel to an outer border of a nucleus of the cell. In another embodiment, the pixel intensity of a profile image is a function of the nearest distances from the pixel to each of a plurality of detected borders of the cell. When used for cell phenotype classification, the profile weighted intensity feature for the cell may be calculated using the profile image of the cell as a weight image.

In certain embodiments, calculation of the profile weighted intensity involves (i) filtering the image, (ii) calculating a distance image $R(x,y)$, or a series of distance images $R_1(x,y)$, $R_2(x,y)$, ..., $R_N(x,y)$, and (iii) calculating a profile image using a profile function $W(R)$ or $W(R_1, R_2, \ldots, R_N)$, or a series of profile functions $W_1(R), W_2(R), \ldots, W_M(R)$, or $W_1(R_1, R_2, \ldots, R_N), W_2(R_1, R_2, \ldots, R_N), \ldots, W_M(R_1, R_2, \ldots, R_N)$.

Calculation of a distance image $R(x,y)$ may take into consideration one or more borders, such as the cell border and the nucleus border. In the case of an internal border (e.g., the nucleus border between a nucleus and a cytoplasm), the distance from border may be measured in two different directions, with one of the directions considered to be a negative direction. As mentioned, sliding parabola erosion may be used to calculate a distance image $R(x,y)$.

Calculation of a profile function, or a series of profile functions, also takes into consideration the distance from one or more borders. If there is more than one distance function (e.g., a function for the distance from cell border and a function for the distance from the nucleus border), then the set of profile functions may be diversified. In one embodiment, the profile function is a function of the distance, R, i.e., $W=W(R)$. The profile image is then $$W(x, y) = W(R(x, y)).$$

When calculating a feature characterizing an object, in certain embodiments, a non-normalized feature is mean intensity of an input image weighted by a profile function. For example, if the profile image is denoted by W and the input image is denoted by I, then the non-normalized profile feature $F_u$ is expressed as $$F_u = \frac{\int W(x, y) I(x, y) dx dy}{\int W(x, y) dx dy}.$$

In some embodiments, it is desirable to normalize the profile feature by dividing it by another intensity. This normalized profile feature $F_u$ is expressed as $$F_n = \frac{\int W(x,y)I(x,y)dxdy \int dxdy}{\int W(x,y)dxdy \int I(x,y)dxdy}.$$

Filtering the input image is an optional step. The filtering may be performed using one or more texture energy filters, for example.

In certain embodiments, profile images are created using several different methods. For example, a single distance image may be used to create a plurality of profile images. A different mathematical function may be used for each profile image to relate intensity in the profile image to intensity in the distance image. In another approach, profile images are created from distance images having multiple borders, such as the distance image in FIG. 6. Compared to a single border, two or more borders allows a higher diversity of profile images to be created. The number of features may be further diversified by using not only the original image but also a filtered image or even a set of filtered images. For each filtered image, additional profile images may be calculated and, as described here, used to identify and characterized morphological features. In certain embodiments, the calculated features may be unnormalized intensities, or normalized ones.

Figure 10A:
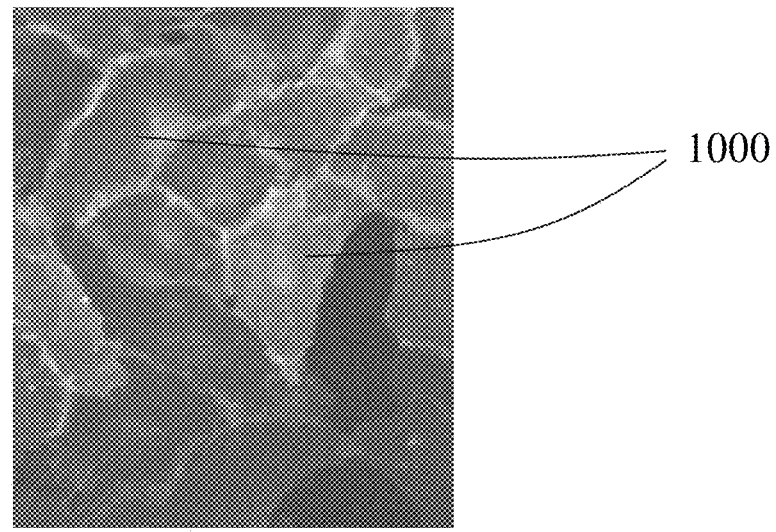
FIGS. 10a and 10b include images from two different samples of a cell-based assay representing two different cell classes, according to an illustrative embodiment of the present invention.
Figure 10B:
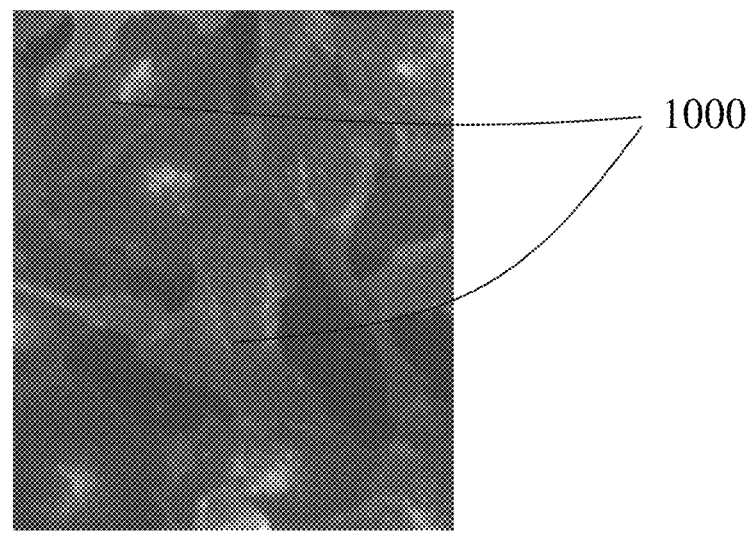

FIGS. 10a through 12 illustrate the use of profile weighted intensity features for the classification of cell phenotype, in accordance with certain embodiments of the invention. FIGS. 10a and 10b include a pair of images of cells 1000 from two different samples of a cell-based assay. FIGS. 11a and 11b include images of the same cells 1000 in FIGS. 10a and 10b, respectively, but the detected cells are masked (i.e., pixels outside the cells are turned black) and cell borders and nucleus borders are highlighted. Comparing the pair of figures, one may notice that the cell class depicted in FIG. 11b includes bright spotty regions 1100 around the nuclei of the cells 1000. These spotty regions 1100 are less noticeable and located more randomly in the cells 1000 of the other cell class depicted in FIG. 11a.

Figure 11A:
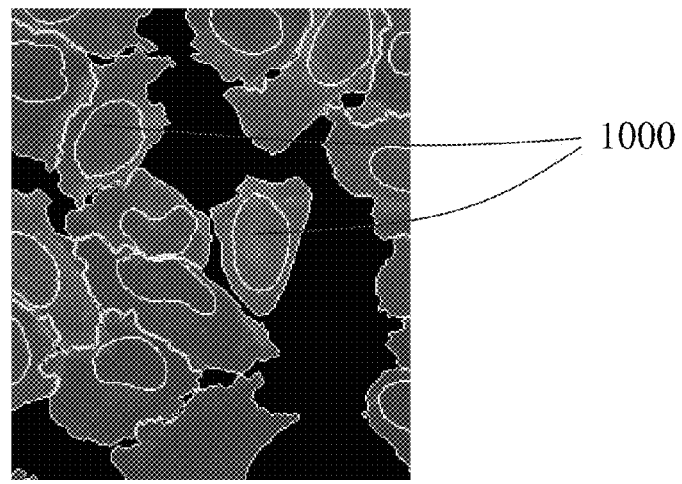
FIGS. 11a and 11b include images from the same cell-based assay depicted in FIGS. 10a and 10b, respectively, with the detected cells masked (i.e., pixels outside the cells are black) and cell and nucleus borders highlighted, according to an illustrative embodiment of the present invention.
Figure 11B:
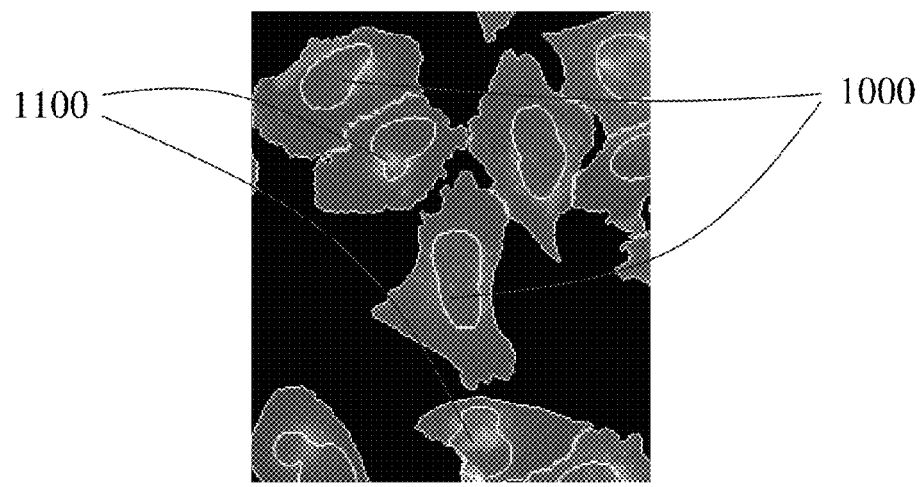
Figure 12:
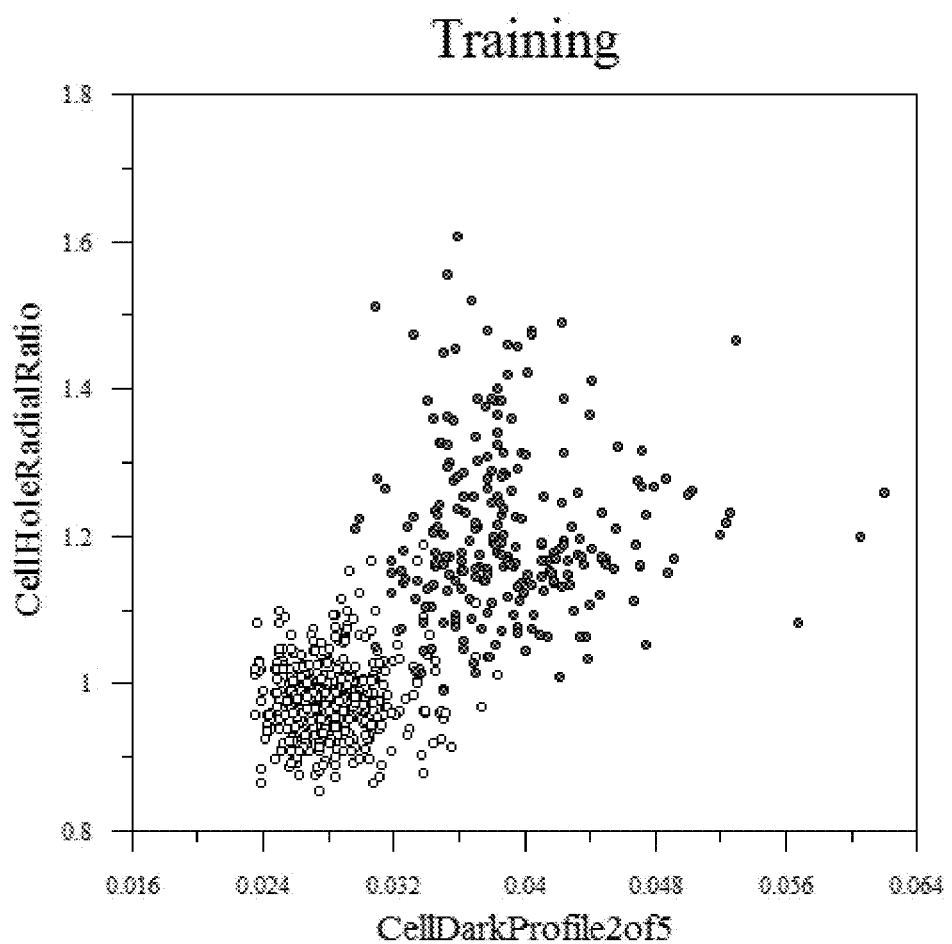
FIG. 12 is an x,y-plot of a best pair of features for separating the two classes of objects depicted in FIGS. 11a and 11b, according to an illustrative embodiment of the present invention.

FIG. 12 includes an x,y-plot of the best pair of features for separating the two classes of objects depicted in FIGS. 11a and 11b. The best pair of features for separating the two classes has been automatically selected by the computer among 165 features routinely calculated for each cell. Each data point represents a cell, with the white and black circles corresponding to two classes of cells, each from different control samples. The x-axis in this figure is a profile weighted intensity feature calculated from a dark-filtered image. This feature characterizes texture in a region of cytoplasm near the nucleus. Indeed, in this region, the cells of the two classes differ the most. The grouping or separation of the black and white circles in this figure indicates that the weighted profile feature (represented by the x-axis) is useful for distinguishing between different cell phenotypes.

The methods and apparatus described herein are applicable universally to data or images of any dimensionality. For example, the equations presented above can be easily applied to a 3-D image, in which R and W are functions of x, y, and z. Because 3-D images generally have more voxels than 2-D images, calculation times are generally longer for 3-D images.

In certain embodiments, the methods described above are implemented on a computer using computer software. In one specific embodiment, to perform feature extraction, the software includes three building blocks to calculate intensity properties, calculate texture properties, and calculate morphology properties. In one embodiment, the software implements a method for extracting many morphology features in parallel, thereby enabling features from several (e.g., five) different families to be combined. One of the families is profile weighted intensity. To calculate profile weighted intensity features, a user applies the building block for calculating morphology properties. The user then ensures that the family of profile weighted intensity features is selected (by default, it is selected). Next, a user may select one or more filters (e.g., an energy filter) to apply and specify input parameters for the filter(s). In another embodiment, a wide set of features is calculated automatically whenever the user requests a classification or regression task. Later, when the tuning is completed (i.e. the relevant features have been identified), only the relevant features will be calculated.

Figure 13:
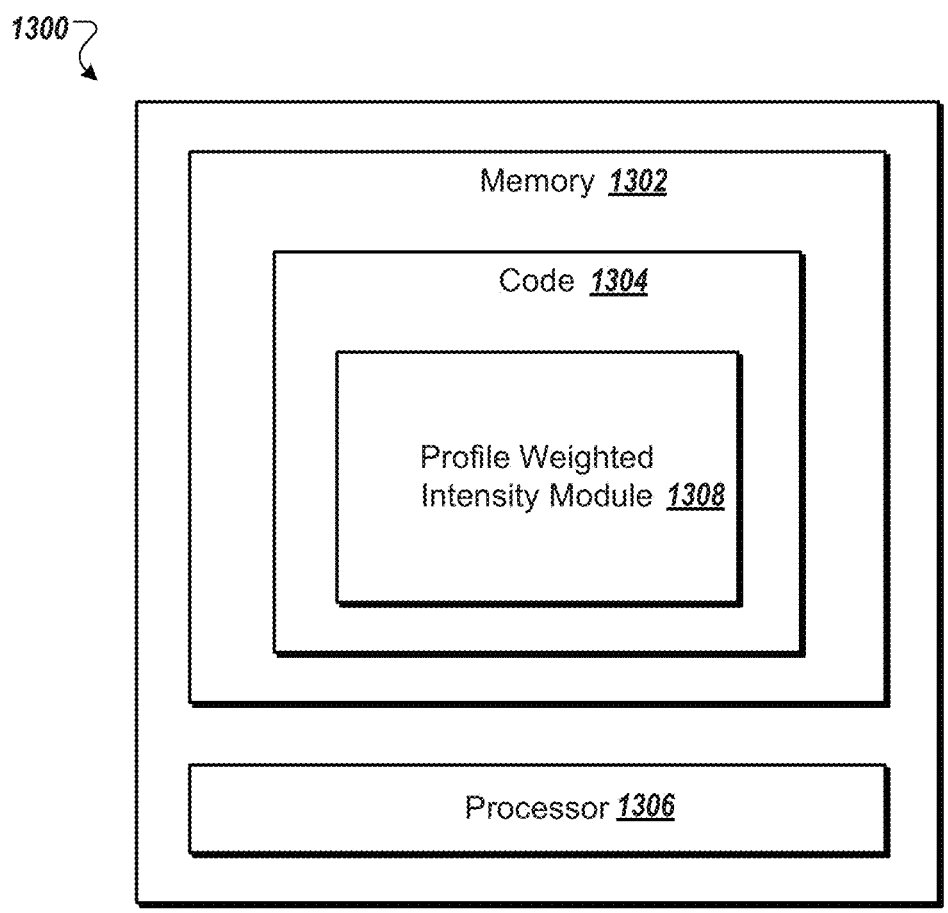
FIG. 13 is a block diagram of an apparatus for determination of a profile weighted intensity feature for a cell useful for classifying cell phenotype, according to an illustrative embodiment of the present invention.

FIG. 13 is block diagram of the apparatus 1300 for determination of a profile weighted intensity feature for a cell useful for classifying cell phenotype. The apparatus 1300 includes a memory 1302 for storing a code 1304 defining a set of instructions. The apparatus also includes a processor 1306 for executing the set of instructions. The code 1304 includes a profile weighted intensity module 1308 configured to execute steps such as those described in FIGS. 9A through 9C above.

Regarding computation times, the most expensive step in the computations may be the calculation of the distance image (or more than one distance image if different borders are involved). For calculation of a distance image, sliding parabola erosion may be employed. In one embodiment, the calculation time for performing sliding parabola erosion on a 1360×1024 pixel image is about 0.17 seconds, using a Dell Latitude 630 (2.2 GHz laptop). All other operations are relatively cheap (i.e., faster). In another embodiment, when a series of profile functions are all based on the same distance function, the whole set is calculated at little or no additional cost. By comparison, when there are several distance functions in a set, each distance function requires approximately the same amount of computation time.

It should be noted that embodiments of the present invention may be provided as one or more computer-readable programs embodied on or in one or more articles of manufacture. The article of manufacture may be any suitable hardware apparatus, such as, for example, a floppy disk, a hard disk, a CD ROM, a CD-RW, a CD-R, a DVD ROM, a DVD-RW, a DVD-R, a flash memory card, a PROM, a RAM, a ROM, or a magnetic tape. In general, the computer-readable programs may be implemented in any programming language. Some examples of languages that may be used include C, C++, or JAVA. The software programs may be further translated into machine language or virtual machine instructions and stored in a program file in that form. The program file may then be stored on or in one or more of the articles of manufacture.

A computer hardware apparatus may be used in carrying out any of the methods described herein. The apparatus may include, for example, a general purpose computer, an embedded computer, a laptop or desktop computer, or any other type of computer that is capable of running software, issuing suitable control commands, receiving graphical user input, and recording information. The computer typically includes one or more central processing units for executing the instructions contained in software code that embraces one or more of the methods described herein. The software may include one or more modules recorded on machine-readable media, where the term machine-readable media encompasses software, hardwired logic, firmware, object code, and the like. Additionally, communication buses and I/O ports may be provided to link any or all of the hardware components together and permit communication with other computers and computer networks, including the internet, as desired. The computer may include a memory or register for storing data.

In certain embodiments, the modules described herein may be software code or portions of software code. For example, a module may be a single subroutine, more than one subroutine, and/or portions of one or more subroutines. The module may also reside on more than one machine or computer. In certain embodiments, a module defines data by creating the data, receiving the data, and/or providing the data. The module may reside on a local computer, or may be accessed via network, such as the Internet. Modules may overlap—for example, one module may contain code that is part of another module, or is a subset of another module.

The computer can be a general purpose computer, such as a commercially available personal computer that includes a CPU, one or more memories, one or more storage media, one or more output devices, such as a display, and one or more input devices, such as a keyboard. The computer operates using any commercially available operating system, such as any version of the Windows™ operating systems from Microsoft Corporation of Redmond, Wash., or the Linux™ operating system from Red Hat Software of Research Triangle Park, N.C. The computer is programmed with software including commands that, when operating, direct the computer in the performance of the methods of the invention. Those of skill in the programming arts will recognize that some or all of the commands can be provided in the form of software, in the form of programmable hardware such as flash memory, ROM, or programmable gate arrays (PGAs), in the form of hard-wired circuitry, or in some combination of two or more of software, programmed hardware, or hard-wired circuitry. Commands that control the operation of a computer are often grouped into units that perform a particular action, such as receiving information, processing information or data, and providing information to a user. Such a unit can comprise any number of instructions, from a single command, such as a single machine language instruction, to a plurality of commands, such as a plurality of lines of code written in a higher level programming language such as C++. Such units of commands are referred to generally as modules, whether the commands include software, programmed hardware, hard-wired circuitry, or a combination thereof. The computer and/or the software includes modules that accept input from input devices, that provide output signals to output devices, and that maintain the orderly operation of the computer. The computer also includes at least one module that renders images and text on the display. In alternative embodiments, the computer is a laptop computer, a minicomputer, a mainframe computer, an embedded computer, or a handheld computer. The memory is any conventional memory such as, but not limited to, semiconductor memory, optical memory, or magnetic memory. The storage medium is any conventional machine-readable storage medium such as, but not limited to, floppy disk, hard disk, CD-ROM, and/or magnetic tape. The display is any conventional display such as, but not limited to, a video monitor, a printer, a speaker, an alphanumeric display. The input device is any conventional input device such as, but not limited to, a keyboard, a mouse, a touch screen, a microphone, and/or a remote control. The computer can be a stand-alone computer or interconnected with at least one other computer by way of a network. This may be an internet connection.

As used herein, an "image"—for example, an image of one or more cells—includes any visual representation, such as a photo, a video frame, streaming video, as well as any electronic, digital or mathematical analogue of a photo, video frame, or streaming video. Any apparatus described herein, in certain embodiments, includes a display for displaying an image or any other result produced by the processor. Any method described herein, in certain embodiments, includes a step of displaying an image or any other result produced via the method.

In certain embodiments, the methods and apparatus described herein are used for cell phenotype classification and may include the feature selection module described in U.S. patent application Ser. No. 13/230,377, filed Sep. 12, 2011, entitled "Methods and Apparatus for Fast Identification of Relevant Features for Classification or Regression," the disclosure of which is hereby incorporated by reference herein in its entirety.

In certain embodiments, the methods and apparatus described herein utilize sliding parabola erosion. A sliding parabola erosion procedure is described in U.S. patent application Ser. No. 13/230,433, filed Sep. 12, 2011 entitled "Methods and Apparatus for Image Analysis and Modification Using Fast Sliding Parabola Erosion," the disclosure of which is hereby incorporated by reference herein in its entirety.

EQUIVALENTS

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A method for determining a profile weighted intensity feature for a cell useful for classifying cell phenotype, said profile weighted intensity feature determined from one or more images of the cell, the method comprising the steps of:
   (a) detecting, by a processor of a computer, a cell in an image;
   (b) computing, by the processor, a profile image for the cell, wherein pixel intensity of the profile image is a function of the closest distance from the pixel to a border of the cell; and
   (c) computing, by the processor, a profile weighted intensity feature for the cell using the profile image of the cell as a weight image, wherein the profile weighted intensity feature for the cell is a weighted mean intensity of pixels of the cell.

2. The method of claim 1, further comprising the step of classifying cell phenotype using the computed profile weighted intensity feature.

3. The method of claim 1, wherein the border is an outer border of the cell.

4. The method of claim 1, wherein the profile image is computed such that pixels near the border of the cell are emphasized and pixels a given distance away from the border of the cell are deemphasized.

5. The method of claim 1, comprising computing a distance image is via sliding parabola erosion operation performed on a cell mask image, wherein the profile image is based at least in part on the distance image.

6. The method of claim 1, wherein the profile weighted intensity feature includes at least one of unnormalized intensities and normalized intensities.

7. The method of claim 1, wherein step (c) comprises computing the profile weighted intensity feature for the cell from a filtered image of an acquired input image of the cell using the profile image of the cell as the weight image.

8. A method for determining a profile weighted intensity feature for a cell useful for classifying cell phenotype, said profile weighted intensity feature determined from one or more images of the cell, the method comprising the steps of:
(a) detecting, by a processor of a computer, a cell and detecting a nucleus of the cell from one or more images of the cell;
(b) computing, by the processor, a profile image for the cell, wherein pixel intensity of the profile image is a function of both (i) the closest distance from the pixel to an outer border of the cell and (ii) the closest distance from the pixel to an outer border of a nucleus of the cell; and
(c) computing, by the processor, a profile weighted intensity feature for the cell using the profile image of the cell as a weight image, wherein the profile weighted intensity feature for the cell is a weighted mean intensity of pixels of the cell.

9. The method of claim 8, wherein the profile weighted intensity feature for the cell is computed from a filtered image of an acquired input image of the cell using the profile image of the cell as the weight image.

10. A method for determining a profile weighted intensity feature for a cell useful for classifying cell phenotype, said profile weighted intensity feature determined from one or more images of the cell, the method comprising the steps of:
(a) detecting a plurality of borders of a cell from one or more images of the cell;
(b) computing a profile image for the cell, wherein pixel intensity of the profile image is a function of the nearest distances from the pixel to each of the plurality of detected borders of the cell; and
(c) computing a profile weighted intensity feature for the cell using the profile image of the cell as a weight image, wherein the profile weighted intensity feature for the cell is a weighted mean intensity of pixels of the cell.

11. The method of claim 10, wherein the profile weighted intensity feature for the cell is computed from a filtered image of an acquired input image of the cell using the profile image of the cell as the weight image.

12. An apparatus for determination of a profile weighted intensity feature for a cell useful for classifying cell phenotype, said profile weighted intensity feature determined from one or more images of the cell, the apparatus comprising:
(a) a memory for storing a code defining a set of instructions; and
(b) a processor for executing the set of instructions, wherein the code comprises a profile weighted intensity module configured to:
(i) detect a cell in an image;
(ii) compute a profile image for the cell, wherein pixel intensity of the profile image is a function of the closest distance from the pixel to a border of the cell; and
(iii) compute a profile weighted intensity feature for the cell using the profile image of the cell as a weight image, wherein the profile weighted intensity feature for the cell is a weighted mean intensity of pixels of the cell.

13. The apparatus of claim 12, wherein the profile weighted intensity module is configured to classify cell phenotype using the computed profile weighted intensity feature.

14. The apparatus of claim 12, wherein the border is the outer border of the cell.

15. The apparatus of claim 12, wherein the profile image is computed such that pixels near the border of the cell are emphasized and pixels a given distance away from the border of the cell are deemphasized.

16. The apparatus of claim 12, wherein the profile weighted intensity module is configured to compute a distance image via sliding parabola erosion operation performed on a cell mask image, wherein the profile image is based at least in part on the distance image.

* * * * *